July 10, 1934.    B. E. GOLD    1,965,834
TRANSMISSION
Filed May 15, 1933    3 Sheets-Sheet 1

INVENTOR
*Bruce E. Gold.*
BY
ATTORNEY

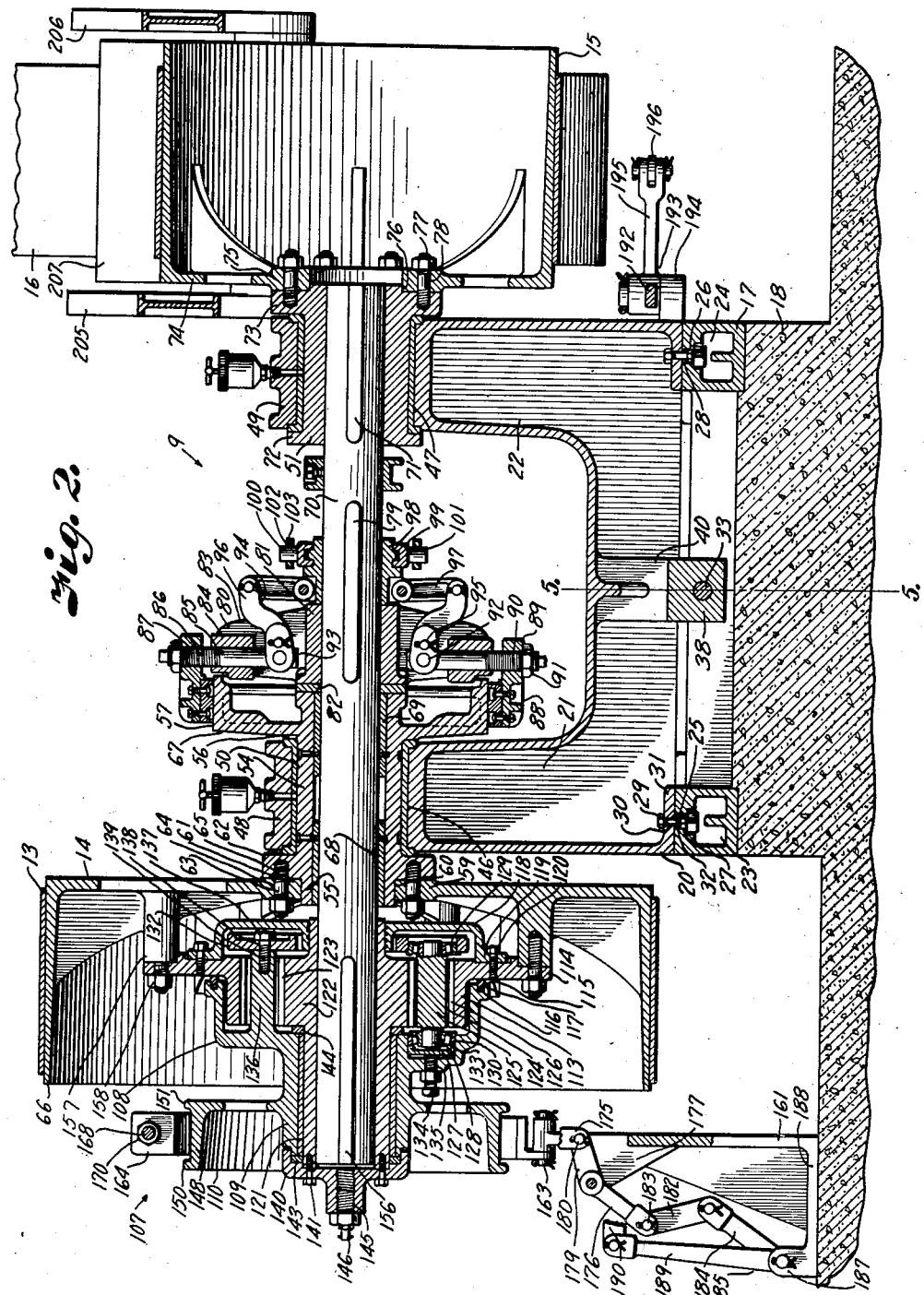

July 10, 1934.  B. E. GOLD  1,965,834
TRANSMISSION
Filed May 15, 1933  3 Sheets-Sheet 3
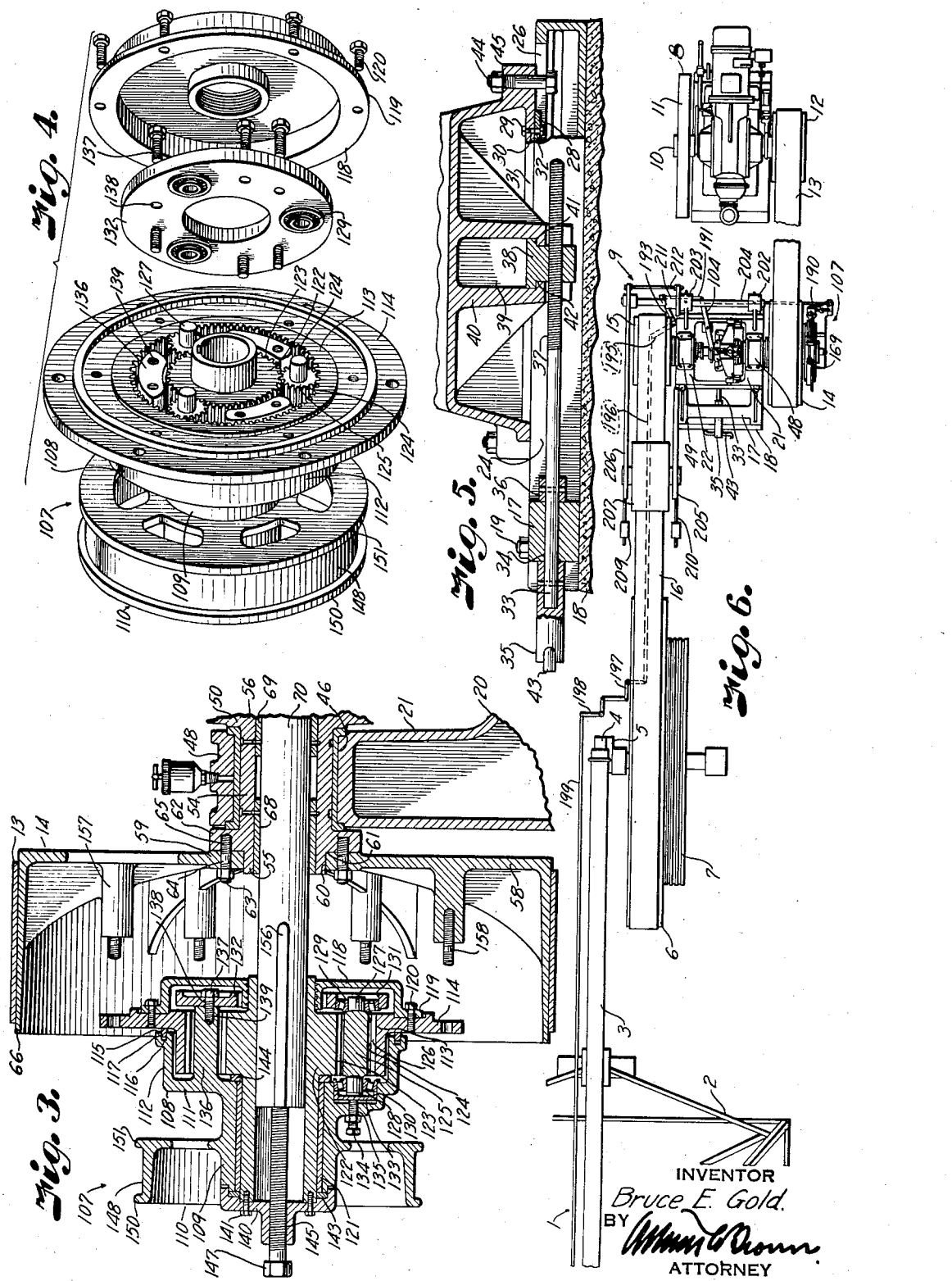
INVENTOR
Bruce E. Gold.
BY
ATTORNEY Patented July 10, 1934

1,965,834

UNITED STATES PATENT OFFICE 1,965,834

TRANSMISSION

Bruce E. Gold, Independence, Mo., assignor to Weber Engine Company, Kansas City, Mo., a corporation of Iowa Application May 15, 1933, Serial No. 671,067

19 Claims. (Cl. 74—34)

This invention relates to a power transmitting apparatus and more particularly to one of that character employed in connection with a prime mover, wherein it is necessary to selectively reverse the direction in which the power is applied.

For example, internal combustion engines are used as power in pumping oil wells, pulling rods, and other operations incidental to oil well practice. To adapt internal combustion engines to such use, various types of reverse clutches are employed to reverse application of the power when it is necessary to pull the rods and tubing or in performing other operations necessary to maintenance of the well. Each engine must, therefore, be equipped with an expensive and cumbersome reverse mechanism which is idle during the majority of the time, since it is not necessary when the well is being pumped. Consequently, when oil production companies are operating large leases having many pumping wells, they have a considerable investment in idle equipment.

It is, therefore, a principal object of the present invention to eliminate the necessity of equipping each well on the lease with a reverse mechanism, but to provide a simple, efficient and relatively inexpensive straightaway transmission for each engine to furnish proper speed reduction when the well is pumping and to provide a single self-contained reversing unit that is readily adapted to be connected to any one of the transmission units when it becomes necessary to pull the rods for each respective well.

It is also an important object of the present invention to provide a transmission unit having extremely short bearing centers wherein the working loads are applied in close proximity to the bearings, thereby reducing its necessary size and weight, as well as the size of the foundation which is required.

Other important objects of the invention are to eliminate the necessity of out-board bearings and their misalignment troubles, and to reduce the initial installation and maintenance costs to the producing company.

Another important object of the invention is to carry the driving belt tensioning means as a part of the unit whereby it retains its alignment when the unit is shifted in tightening the drive belt.

In accomplishing these and other objects of the invention, I have provided improved details of structure, the preferred form of which is illustrated in the accompanying drawings, wherein:

Fig. 1 is a perspective view of a transmission unit constructed in accordance with my invention and showing the reversing unit in functional position on the jack shaft.

Fig. 2 is a longitudinal vertical section through the transmission unit.

Fig. 3 is a detail vertical section through the transmission drive pulley and its adjacent supporting bearing illustrating the method of removing the reverse unit.

Fig. 4 is a detail perspective view of the reversing unit showing the planet gear carrier disk and the cover plate removed to better illustrate the planetary reverse gearing.

Fig. 5 is a detail cross sectional view on the line 5—5, Fig. 2, showing the jack screw for adjusting the transmission on its sub-base to tension the drive belt.

Fig. 6 is a plan view of the transmission unit as it is connected with a pumping unit of an oil well.

Referring more in detail to the drawings:

1 designates a conventional pumping rig which includes a derrick 2, a walking beam 3 operated by a pitman 4 and crank 5 from the band wheel 6.

The band wheel 6 carries a tug pulley 7 for operating a bull wheel (not shown) when the rods or tubing are to be removed from the well. The band wheel 6 is operated by a suitable prime mover 8 through a transmission unit 9 constructed in accordance with my invention.

In the illustrated instance, the prime mover includes a conventional type gas engine having a crank shaft 10 equipped with a fly wheel 11 and a pulley 12, the pulley 12 taking the place of the customary second fly wheel in order to eliminate the necessity of providing an out-board bearing and a pulley shaft, as is the present practice.

By mounting the pulley directly on the crank shaft, the main bearings of the engine are completely adequate in retaining the pulley in driving alignment with the transmission and since no out-board bearing is required, there is no chance of misalignment of the pulley and the drive belt 13 may be readily removed and applied to the pulley.

The drive belt 13 extends forwardly of the engine in the direction of the derrick and operates over a transmission driving pulley 14 to operate a power take-off pulley 15 which is positioned in driving alignment with the band wheel 6 and carries a driving belt 16 operable over the face of the band wheel.

The transmission unit 9 is best illustrated in Figs. 1 and 2 and includes a substantially rectangular frame like sub-base 17 that is mounted upon a suitable foundation 18 by means of bolts 19 having their heads anchored in the foundation and their shanks extending through openings in the sub-base for accommodating nuts to clamp the sub-base to the foundation.

Supported on the sub-base 17 is a jack shaft supporting member including a hollow rectangular base 20 having laterally spaced bearing posts 21 and 22. The base 20 is adjustably mounted on the sub-base 17 so that the transmission drive pulley may be moved to and from the engine for tensioning the drive belt, as now to be described.

The sub-base includes side rails 23 and 24 which are provided with longitudinal slots 25 and 26 for receiving ribs or lugs 27 and 28 that are secured to the base 20 by fastening devices 29 extending through openings 30 in flanges 31 on the base and through openings 32 in the ribs. The slots 25 and 26 thus provide guides to prevent lateral displacement of the supporting frame during its adjustment on the sub-base.

The supporting frame is adjusted by a jack screw 33 that is rotatably mounted in a bearing opening 34 in a front rail of the sub-base and carries a head 35 which engages the outer face of the rail and a collar 36 that engages the inner face of the rail whereby the screw is retained from longitudinal movement relatively to the sub-base. The opposite end of the jack screw is threaded as at 37 and extends through a threaded nut 38 that is guidingly supported in a socket 39 formed in a lug 40 projecting downwardly from the base 20, as best illustrated in Figs. 2 and 5.

The nut 38 is suspended in the socket 39 by means of lateral flanges 41 that engage inwardly extending flanges 42 carried by the lugs 40. The nut 38 is thus free to adjust itself relatively to the bearing opening 30 to prevent binding of the screw when it is rotated in moving the supporting frame on the sub-base.

The jack screw is manually operated by a bar 43 extending through the head 35 thereof, as illustrated in Figs. 5 and 6.

It is thus apparent that rotation of the jack screw in the proper direction will move the supporting frame on the sub-base to and from the engine mounting, thereby tightening the belt 16. After the adjustment has been made, the supporting frame is retained in its adjusted position by clamping bolts 44 extending through lugs 45 on the base 20 and through the slots 25 and 26, as illustrated in Fig. 5.

Formed in the upper ends of posts 21 and 22 are concave bearing seats 46 and 47 which cooperate with bearing caps 48 and 49 for rotatably mounting a quill 50 and a collar 51 of the power take-off pulley respectively. The bearing caps 48 and 49 carry lateral flanges 52 by which they are anchored to the tops of the posts 21 and 22 by cap screws 53, as in ordinary bearing construction.

The quill 50 includes a sleeve portion 54 having its opposite ends 55 and 56 extending from opposite sides of its supporting bearing to mount the transmission drive pulley 14 and a clutch drum 57, as now to be described.

The transmission drive pulley 14 is preferably pan shaped and includes a disk portion 58 having a hub 59 provided with an axial opening 60 to snugly receive the end 55 of the quill and engage against an annular shoulder 61 thereon that is formed by an inset flange 62, the pulley being secured to the flange by stud bolts 63 extending through openings 64 in the hub and into threaded sockets 65 in the flange.

The pulley also includes an annular crown shaped flange 66 extending laterally from the face of the disk portion to form a drive face over which the driving belt operates.

The clutch drum is preferably formed integrally with the opposite end 56 of the quill and includes an annularly extending disk or web portion 67 having a lateral annular flange projecting in a direction opposite to the bearing 48 to form a braking surface for the clutch shoes, later described.

The inner diameter of the quill is provided with spaced bushings 68 and 69 for rotatably mounting one end of the jack shaft 70 which has its other end keyed within the collar 51 by a spline 71.

The collar 51 is retained against lateral movement in the bearing by annular flanges 72 and 73 arranged for engaging opposite sides thereof.

The power take-off pulley is similar in shape to the transmission drive pulley and includes a disk portion 74 having a hub 75 seated against a shoulder 76 formed in the flange 73 and which is secured thereto by stud bolts 77 extending through openings 78 in the hub and into threaded sockets in the flange.

The periphery of the disk portion 73 carries a laterally extending annular flange to form the driving face for the belt 16.

In order to selectively couple the driving pulley to the shaft, I provide a clutch mechanism for gripping the clutch drum, as now to be described.

Keyed to the shaft by a spline 79 at a point midway between the bearings 48 and 49 is a clutch shoe carrier 80 including a hub portion 81 rotatably engaging a washer 82 located adjacent the inner end of the quill, as illustrated in Fig. 2. Extending from the hub 81 are arms 83 carrying a rim 84 having substantially the same diameter as the clutch drum. The rim 84 is provided at spaced intervals with bearing openings 85 in which are slidably mounted clutch studs 86 having threaded outer ends 87 supporting gripping members 88.

The gripping members 88 include clutch shoes shaped to engage the periphery and have laterally extending ears 89 provided with threaded openings 90 for engaging the threaded ends of the studs, whereby the shoes are adjusted relatively to the diameter of the drum. The clutch shoes are retained in adjusted position on the studs by lock nuts 91 engaging the outer face of the shoes.

The inner ends of the clutch arms are connected by pins 92 to the arms 93 of bell cranks 94 pivotally mounted on pins 95 projecting from the arms 83 and have their other arms 96 pivotally connected by links 97 with an actuating collar 98. The actuating collar is slidably keyed on the shaft 135 by the spline 79 and is shifted thereon to and from the shoe carrier by a clutch actuating ring 99.

The ring 99 is provided with laterally extending studs 100 and 101 engaging in openings 102 in an actuating yoke 103 carried on the end of a shifting lever 104, the lever 104 being pivotally mounted on a pin 105 projecting from a bracket 106 fixed to the base 20 of the supporting frame, as clearly illustrated in Fig. 1.

It is thus apparent that when the lever is shifted on its pivot, the collar 98 causes the links 97 to rock the bell cranks for moving the shoes to and from clutching engagement with the clutch drum to connect and disconnect the jack shaft in driving relation with the driving pulley 14.

When the clutch shoes are engaged with the drum, the belt 13 operating over the pulley 14 rotates the clutch drum through the quill 50 and the clutch drum rotates the jack shaft in the same direction through the clutch shoes and their carrier 80 and, since the power take-off pulley is operably keyed to the jack shaft, the belt 16 will drive the band wheel in the same direction.

In the construction thus far described, I have provided a straightaway transmission, wherein the pulleys are so arranged on the jack shaft and the jack shaft supported in the narrowly spaced bearings that I am enabled to provide a very compact, light weight structure that is well adapted to the pumping of wells, but in order to use the engine and transmission in pulling rods and the like, it is necessary to provide a reverse mechanism to change the direction of rotation of the band wheel so that the tug wheel may be operated in either direction.

In carrying out my invention, as above pointed out, I provide a reversing unit that is readily adapted to the transmission when the rods are to be pulled and then removed when the well is again placed in pumping operation.

The reversing unit 107 includes a housing 108 having a hub portion 109 carrying a brake drum 110 at one end and a cylindrical gear casing at the other formed by a web portion 111 extending laterally therefrom, and a peripheral wall portion 112 in which is rotatably mounted a ring shaped orbit gear 113.

The gear 113 carries a radial flange 114 extending beyond the wall of the casing to form an attaching means whereby the unit is attached to the pulley 14.

In order to seal the space between the flange 114 and the wall 112, the edge 115 thereof is provided with an annular groove 116 which carries a flexible sealing ring 117 frictionally engaging the side of the flange.

The opposite side of the housing is closed by a cup shaped plate 118 having an attaching flange 119 that is secured to the opposite side of the flange 114 by cap screws 120. Rotatably mounted within a bushing 121 in the hub portion and in a bearing in the cover plate 118 is a sun gear 122 having gear teeth 123 meshing with the teeth 124 of planetary gears 125 which intermesh with the teeth 126 of the orbit gear.

The planetary gears 125 have laterally extending trunnions 127 rotatably mounted in antifriction bearings 128 and 129 carried in sockets 130 and in bearing openings 131 in a carrier disk 132 respectively.

Cups 133 are adjustably mounted in the sockets 130 formed in the web of the gear casing and are moved within the sockets to take up wear of the bearings by set screws 134 threaded in openings 135 in the casing and bearing against the cups.

The carrier disk 132 is fixed to lugs 136 extending inwardly of the gear casing at points between the planetary gears 134, the disk being secured to the lugs by cap screws 137 extending through openings 138 in the disk and into sockets 139 in the lugs, as is clearly illustrated in Figs. 2, 3 and 4.

In order to retain the housing against lateral movement on the hubs of the sun gear, I provide a cap 140 that is secured to the sun gear by screws 141 and which is of sufficient diameter to sealingly overlap the outer end of the hub portion of the housing.

If desired, thrust washers 143 and 144 may be inserted between the housing and the sun gear and between the end of the hub portion 109 and the cap member 140.

The cap 140 carries an outwardly extending axial boss having a threaded bore 145 to receive a lubricant fitting 146 or a jack screw 147 when it is desired to pull the reversing unit from the jack shaft, as is illustrated in Fig. 3.

The brake drum 110 includes an annular flange 148 having spaced ribs 150 and 151 forming a braking surface to stop planetation of the planet gears, as hereinafter described.

The unit thus described is mounted on the projecting end of the shaft and the sun gear is keyed thereto by a spline 156, while the flange 114 is bolted to lugs 157 on the pulley 14 by stud bolts 158.

The entire reversing unit will, therefore, rotate with the pulley and in order to selectively stop rotation thereof, so that the planet gears will be rotated on their axes by the orbit gear to drive the sun gear which in turn drives the shaft and power take-off pulley, I provide a braking mechanism for the drum 110 including a pair of arcuate shaped brake shoes 159 and 160 arranged to engage opposite sides of the drum.

The lower ends of the shoes 159 and 160 are pivoted to a fulcrum bracket 161 by pins 162 and 163, as shown in Fig. 1. The upper ends of the shoes are provided with ears 164 and 165 having openings 166 and 167 for mounting a draw rod 168 which extends loosely through the opening 167, but is anchored in the opening 166 by lock nuts 169 and 170 threaded on the rod and engaging opposite sides of the ear 164. The opposite end of the draw rod carries an eye that is pivotally connected to an arm 171 of a bell crank lever 172, the bell crank lever 172 being pivotally mounted on the brake shoe 160 by a pin 173.

The free end 174 of the bell crank lever 172 extends outwardly from the shoe and is connected by a link 175 to a bell crank lever 176 that is mounted between ears 177 and 178 carried by the fulcrum bracket 161. The arm 179 of the bell crank is connected to the link by a pin 180, while the other arm 181 of the bell crank is connected to a toggle link 182 by a pin 183.

The toggle link 182 in turn is connected to an arm 184 of another bell crank lever 185 mounted between ears 186 and 187 on the base flange 188 of the fulcrum bracket.

The other arm 189 of the bell crank lever 185 extends upwardly and is pivotally connected to the clutch actuating lever 104 by a reach rod 190 so that the clutch and brake shoes are alternately engaged and disengaged with their respective drums when the actuating lever is shifted from the derrick floor, as later described.

Also connected with the lever arm 104 is a reach rod 191 having its opposite end connected to an arm 192 of a bell crank lever 193, the bell crank lever being pivotally mounted on an ear 194 extending from the supporting frame at a point below the power take-off pulley.

The other arm 195 of the bell crank lever is connected with an operating rod 196 which has its opposite end coupled to a series of intercoupled bell crank levers, 197 and 198, that are in turn actuated by a control rod 199 from the derrick floor.

In order to automatically tighten the band wheel belt, I provide a belt tightener which is mounted on and forms a permanent part of the transmission unit, as now to be described.

Formed on the rear sides of the bearing posts 21 and 22 are brackets 200 and 201 carrying aligning horizontally positioned sleeves 202 and 203.

Extending loosely through the sleeves is a rod 204 having one end extending in parallel relation with the power take-off pulley for mounting a pair of lever arms 205 and 206 carrying an idler pulley 207. The idler pulley 207 is rotatably mounted on a shaft connecting the free ends of the arms and is retained in contact with the belt by weights 209 supported on the rods 210 projecting from the ends of the arms, as illustrated in Fig. 6.

The rear ends of the arms have hubs 211 to receive the rod 204 and are tied in spaced relation by a rod 212 extending through ears 213 and 214 on the hubs, the ends of the rod being threaded to mount nuts 215 and 216 engaging opposite sides of the ears. The idler pulley carrying arms are retained in position by the sleeve 203 and a collar 217 fixed on the other end of the rod by a set screw 218.

In order to adjust the idler pulley so that it will align with the upper run of the band wheel belt, the rod 204 is adjustably fixed within the sleeves 202 and 203 by set screws 219 extending radially therethrough and engaging the rod from opposite diametrical points so that the axis of the rod may be adjusted laterally from the axis of the sleeves to shift the idler pulley relatively to the axis of the jack shaft.

In mounting a transmission in connection with a prime mover and an oil well rig, assembled and constructed as described, the sub-base 17 is secured on the foundation between the prime mover and the band wheel of the pumping rig, with the power take-off pulley aligning with the band wheel and the drive pulley with the engine pulley.

The driving and band wheel belts are applied to their respective pulleys and the supporting frame is adjusted on the sub-base by manipulation of the jack screw to properly tension the drive belt.

After the adjustment, the clamping bolts 44 are tightened to secure the supporting frame of the transmission in fixed adjusted position on the sub-base.

The idler pulley is adjusted over the upper run of the band wheel belt by manipulating the set screws 219 until the center of the idler pulley aligns with the center of the belt.

The engine is then started and the clutch control rod 199 is actuated to cause the shoes 89 to engage the periphery of the clutch drum, thereby operably connecting the jack shaft in driving relation with the pulley 14 to operate the power take-off pulley and drive the band wheel.

The drive to the jack shaft is from the prime mover and pulley 14, through the quill member 50, clutch drum 57, and clutch shoes, to the shoe carrier 80, which is keyed to the shaft by the spline 79.

The transmission is then operating in a straightaway direction to pump the well.

When it is desired to stop operation of the band wheel, the control rod is moved in the opposite direction to shift the clutch collar to the right, Fig. 2, for raising the clutch shoes from engagement with the clutch drum.

The pulley 14, quill 50, and the clutch drum will then rotate as a unit about the jack shaft within the bearing carried by the post 21, the clutch shoe carrier, and jack shaft remaining idle.

Attention is directed to the fact that during pumping of the well the reversing unit may or may not be mounted on the projecting end of the jack shaft. However, it is desirable that it be removed, because, as above pointed out, it may be used in connection with any other similar transmission on the lease.

When it is necessary to pull the rods, a reversing unit must be connected with the transmission and this is accomplished by sliding it as a unit onto the projecting end of the jack shaft so that the sun gear engages the key 156.

The nuts are then applied to the studs 158 to secure the orbit gear of the unit to the driving pulley, after which the brake shoes and their actuating mechanism are assembled and connected with the clutch shifting lever 104.

When the engine is again started, the pulley 14 will rotate idly on the shaft rotating the orbit gear, but the orbit gear simply causes the planet gears to planetate about the sun gear rotating the reverse housing and the brake drum 110, but the shaft remains idle.

When it is desired to actuate the pulley 15 in forward direction, the control rod is operated to engage the clutch shoes, as when the transmission is operating the pump, but when it is desired to rotate the pulley in the opposite direction, the control rod is shifted reversely to disengage the clutch shoes and engage the brake shoes with the brake drum 110, thereby stopping rotation of the drum and planetation of the planet gears.

However, since the orbit gear is positively driven by the driving pulley, the planet gears are rotated upon their axial mounting to drive the sun gear and shaft in reverse direction to rotation of the pulley.

After the operation has been completed which requires reversing of the transmission, the reversing unit may be removed as a unit by removing the nuts from the studs 158 and by inserting the jack screw 147 in the cap 140 so that the end thereof engages against the end of the shaft. It is then slowly tightened to withdraw the unit from keying relation with the spline 156. After removal, the reversing unit may be applied to the transmission of another well if it is necessary to reverse operation of that transmission.

From the foregoing, it is apparent that I have provided a short center jack shaft mounted in its bearings in such a manner that the driving strain of the belts is taken by the bearings, so that a smaller shaft may be used, and, consequently, a smaller support and foundation for the transmission.

It is also obvious that the reversing unit is readily removed and applied as a complete unit to the transmission whenever it becomes necessary to reverse operation of the band wheel.

Also, by mounting the idler on the sub-base, a constant relation is maintained between idler and the take-off pulley, and all ineffective weight of the idler due to angular position on the belt eliminates belt pull on the jack shaft foundation.

What I claim and desire to secure by Letters Patent is:

1. In a device of the character described, a support, spaced bearings on the support, a shaft rotatably supported in the bearings and having ends extending beyond the bearings, driving and driven members mounted on the extending ends of the shaft, clutch means mounted on the shaft between said bearings, means for fixing one of said members to the shaft, and means connecting the other of said members with the clutch means to effect operation of the driven member through said shaft.

2. In a device of the character described, a support, spaced bearings on the support, a shaft rotatably supported in the bearings and having ends extending beyond the bearings, a driving member rotatably mounted on one end of the shaft, a driven member fixed to the opposite end of the shaft, clutch means mounted on the shaft between said bearings, and means connecting the driving member with the clutch means to effect operation of the driven member through said shaft.

3. A device of the character described including a support, spaced bearings on the support, a quill member rotatably mounted in one of said bearings, a collar member rotatably mounted in the other bearing, driving and driven members, means for mounting said members on the quill and collar at outer ends of the bearings, a shaft extending through said quill and collar, means securing the collar to the shaft, a clutch drum fixed to the quill at the inner end of the bearing mounting the quill, and clutch engaging means fixed to the shaft for operably connecting the quill with the shaft.

4. In a device of the character described, a support, spaced bearings on the support, a shaft rotatably mounted in the bearings and having ends extending beyond the bearings, a driving member mounted for rotation about the axis of one of said projecting ends of the shaft, a driven member fixed to the other end of the shaft, clutch means on the shaft between said bearings, and a quill rotatably mounted in the bearing adjacent the driving member for operably connecting the driving member with the clutch means to actuate the driven member.

5. In a power transmission unit including driving and driven members, a shaft for supporting said members, means for supporting the shaft so that one end projects beyond the supporting means, means cooperating with one member to operate the other member in one direction, and a reversing unit removably mounted on the projecting end of the shaft and removably connected with one of said members to cause operation of the driven member in the reverse direction.

6. In a device of the character described, a support, spaced bearings on the support, a shaft rotatably supported in the bearings and having ends extending beyond the bearings, driving and driven members mounted on the projecting ends of the shaft, clutch means mounted on the shaft between said bearings, means fixing one of the members to the shaft, means connecting the other member with the clutch means to effect operation of said fixed member through said shaft, a reversing unit mounted on the end of the shaft adjacent the driving member, and means for detachably connecting said unit with the driving member whereby the unit may be removed from the shaft without disconnecting said members.

7. In a device of the character described, a support, spaced bearings on the support, a shaft rotatably mounted in the bearings and having ends extending beyond the bearings, a driving member rotatably mounted on one end of the shaft, a driven member fixed to the opposite end of the shaft, clutch means mounted on the shaft between said bearings, means connecting the driving member with the clutch means to effect operation of the driven member through said shaft, a reversing unit arranged to slide onto the end of the shaft adjacent the driving member, and means for detachably connecting the unit with the driving member for reversing rotation of the shaft.

8. In a device of the character described, a support, a shaft, means rotatably mounting the shaft on the support so that one end extends beyond said mounting means, a member mounted for rotation about the axis of said projecting end of the shaft, clutch means on the shaft, a quill rotatable in the mounting means for operably connecting said member with the clutch means, a reversing unit mounted on the projecting end of the shaft, and means detachably connecting said unit with said member.

9. A device of the character described including a support, spaced bearings on the support, a quill member rotatably mounted in one of said bearings, a collar member rotatably mounted in the other bearing, pan shaped pulleys, means for mounting one of said pulleys on the quill and the other on the collar at outer ends of the bearings, a shaft extending through said quill and collar and having an end projecting through the quill within one of said pulleys, means for securing the collar to the shaft, a clutch drum fixed to the quill at the inner end of the bearing mounting the quill, clutch engaging means fixed to the shaft for operably connecting the quill with the shaft, a reversing unit removably mounted on the projecting end of the shaft and housed within said pulley, and means for connecting the unit with the pulley.

10. A device of the character described including a support, a bearing on the support, a quill member rotatably mounted in said bearing, a pulley fixed to the quill, a shaft having one end supported by said quill and projecting therefrom, means for supporting the other end of the shaft, a clutch drum fixed to the quill at the inner end of the bearing mounting the quill, and clutch engaging means fixed to the shaft for operably connecting the quill with the shaft.

11. In a device of the character described, a support, spaced bearings on the support, a shaft rotatably mounted in the bearings and having ends extending beyond the bearings, a driving member rotatably mounted on one end of the shaft, a driven member fixed to the opposite end of the shaft, clutch means mounted on the shaft between said bearings, means connecting the driving member with the clutch means to effect operation of the driven member through said shaft, a reversing unit arranged to slide onto the end of the shaft including a housing, a sun gear in the housing, planet gears meshing with the sun gear, an orbit gear meshing with the planet gears, means securing the orbit gear to the driving member, and a brake for controlling the planet gears.

12. In combination with a straightaway transmission having a projecting shaft and a driving member on the end of said shaft, a reversing mechanism including a sun gear fixed to the end of the shaft, a housing rotatable about the sun gear, planet gears carried by the housing, an orbit gear meshing with the planet gears, means for detachably connecting the orbit gear with the driving member, and means for controlling operation of the planet gears to effect rotation of the shaft in reverse direction to that of the driving member.

13. A device of the character described including a support, a bearing on the support, a quill member rotatably mounted in said bearing, a pulley fixed to the quill and having lugs extending therefrom, a shaft having one end supported by said quill and projecting therefrom, means for supporting the other end of the shaft, a clutch drum fixed to the quill at the inner end of the bearing mounting the quill, clutch engaging means fixed to the shaft for operably connecting the quill with the shaft to drive the shaft in one direction, a reverse gearing removably supported on the end of the shaft, and means connecting said gearing to the lugs on the pulley to drive the shaft in the reverse direction.

14. In combination with a pumping rig including a band wheel and a prime mover, a transmission including a driving pulley on the prime mover, a support, a shaft rotatably mounted on the support having ends projecting from the support, pulleys on the projecting ends of the shaft, belts operating over the pulleys and over the band wheel and said driving pulley respectively, a reversing unit mounted on one end of the shaft, and means for removably connecting the reversing unit to the shaft and the adjacent pulley without disturbing the driving connections of the belts.

15. In combination with a pumping rig including a band wheel and a prime mover, a transmission including a support, a shaft rotatably mounted on the support having ends projecting from the support, driving and driven members on the projecting ends of the shaft, means operably connecting the driving member with the prime mover, means connecting the driven member with the band wheel, a reversing unit, and means removably mounting the reversing unit on the shaft without disturbing the connecting means.

16. In combination with a pumping mechanism and a prime mover therefor, a transmission including a support, a shaft rotatably mounted on the support, driving and driven members mounted on the ends of the shaft, driving connections between the prime mover and the driving member and between the driven member and the pumping mechanism, a reversing unit, and means removably mounting the reversing unit on the shaft whereby the unit may be removed from the shaft without removing said driving connections.

17. In combination with a base member, a support on the base member, a reverse clutch mechanism on said support including driving and driven pulleys, belts operating over said pulleys, an idler pulley for tensioning one of said belts, means mounting said idler pulley on the support, and means for adjusting the support on the base to adjust the other of said belts.

18. In combination with a base member, a support on the base member, one of said members having a slot and the other a guide member slidable in said slot to retain the support against lateral movement on the base, a reverse clutch mechanism on said support including driving and driven pulleys, belts operating over said pulleys, an idler pulley for tensioning one of said belts, means mounting said idler pulley on the support, and means for adjusting the support on the base to adjust the other of said belts.

19. In a device of the character described, a base member having a slot, a support having a rib engaging in said slot to guide the support for movement in one direction on the base member, spaced bearing posts on the support, a shaft rotatably supported by the bearing posts and having ends projecting from the support, driving and driven pulleys on the projecting ends of the shaft, belts operating over said pulleys, arms extending from the bearing posts, a rod adjustably mounted in said arms, an idler pulley engaging the belt on the driven pulley, means for pivotally mounting the idler pulley on said shaft, and means for shifting the support on said base to tension the other of said belts.

BRUCE E. GOLD.